Patented Dec. 20, 1938

2,141,087

UNITED STATES PATENT OFFICE 2,141,087

LARVICIDE AND PROCESS FOR PREPARING SAME

Walter D. Martin, Albany, Ga.

No Drawing. Application May 21, 1937, Serial No. 144,091

6 Claims. (Cl. 167—43)

This invention relates to larvicides and processes of preparing the same, and it comprises, as a new larvicide, a quick-breaking, partial emulsion containing water gas tar and gas oil, and it further comprises processes wherein water gas tar and gas oil are partially emulsified in water containing tallow soap and rosin under conditions which form a relatively unstable emulsion.

Various emulsions of tar oils, hydrocarbon oils, and the like have been proposed as insecticides for the control of flies, vermin and similar insects. Such oily emulsions are also used as sheep dips, spraying compounds for washing fowls or animals, the impregnation of twine, fabrics and other materials subjected to insects, such as grasshoppers, which may destroy the fabric materials; and it is common to impregnate wood with such aqueous emulsions.

I have now discovered that a material known as water gas tar has unusually good larvicidal properties. But before employing the water gas tar for this purpose it is essential that it be emulsified in water, but under conditions which give only a partial emulsion, and one which readily breaks after application of the emulsion to the place of use. I am aware that others have used gas tar emulsified in water as an insecticidal wash for trees. These prior art emulsions are composed of gas tar, whale-oil soap dissolved in hot water, and enough clay or loam to give a thick plastic mass. Such emulsions are not sprayable and are, of course, of no use in the control of larvae.

A larvicide for use in mosquito control, the treatment of sewers, and application to ponds and pools must have specific characteristics which distinguish it from ordinary emulsions of oils in water. An ordinary emulsion is intended to be stable, and the emulsified particles should be so minute that to all intents and purposes the emulsified material appears to be homogeneous throughout. Such emulsions are mayonnaise, emulsified liver oils, and similar liquid preparations. If such emulsions are not stable, and the oil particles are not minute, the emulsion is of no practical value.

On the other hand, a larvicidal emulsion must be entirely dissimilar. It should be quick-breaking, and there should be only a partial emulsification of the larvicidal oily agent. This is because the destruction of larvae is dependent upon the formation of a larvicidal film on the surface of the stagnant or moving body of water in which the larvae breed. Preparation of suitable larvicidal emulsions is attended by considerable difficulty. Oily materials hitherto used have either been deficient in toxicity, or it has been difficult to prepare the proper kind of emulsion from them. The degree of dispersion of the oily material is important for reasons stated above.

I have now discovered that water gas tar, especially when used in conjunction with ordinary gas oil, has highly potent larvicidal properties. Water gas tar is a common commodity obtained as a by-product in the manufacture of carbureted water gas for illuminating purposes.

I have discovered ways by means of which this material can be emulsified to give a partial emulsion or dispersion which is quick-breaking and which, when applied to a stagnant pool of water, quickly forms a larvicidal film over the surface and permits the release of those toxic properties in the tar which kill the larvae.

I shall now describe advantageous ways of preparing my larvicide.

I first prepare a soap-type emulsifying agent by dissolving about twenty pounds of caustic soda in ten gallons of water, add thereto about one hundred pounds of melted tallow and boil the mixture to saponify the tallow and form soap therefrom.

During the saponification it is best to add additional quantities of water to the extent of about thirty to fifty gallons and after saponification I allow the mixture to cool. The product is a hard tallow soap containing water. It is understood, however, that the tallow soap can be made in this or any of the ordinary ways for making such a material. For the preparation of the larvicide of my invention, I then proceed as follows. Four gallons of water gas tar are admixed with two gallons of gas oil and three pounds of the tallow soap added thereto. Since this soap contains considerable water it will, of course, dissolve in the mixture when agitated with heat. I then heat the mixture of tar, oil and soap with steam under a pressure of about twenty pounds and stir gently until the soap is dissolved. One pound of rosin is then added and the mixture stirred until the rosin is dissolved. I am not certain that a rosin soap is formed. On the contrary, I believe that the rosin aids in the formation of a partial emulsion which is quick-breaking when applied to pools and ponds.

The above mixture is then heated with steam and boiled rapidly. This is followed by the addition of water thereto and steam and water are continuously added until about fifteen to twenty gallons of water have been incorporated. Care should be taken during the emulsification of the oily mixture in the water so that the process can be stopped at that point where only a partial, quick-breaking emulsion is formed. This can be determined by withdrawing small portions of the emulsion from the kettle in which it is made, and noting the approximate size and quantity of the oil globules. Emulsification should be stopped before all of the oil is completely dispersed. At the conclusion of the mixing process small globules of tar and oil should be present so that, after a small portion is allowed to stand for a few minutes, there will immediately rise to the top of the portion a film of tar and oil about one-sixteenth of an inch thick.

During the mixing process the mixture of tar, oil and water is first a dirty black, but after emulsification proceeds the color turns a definite brown. This stage during the emulsification process can be readily noted after a few trials. In any event, the final product should be one in which a thin film of oily material will rise to the surface of the liquid material, thus showing that emulsification is incomplete. I believe, however, that the secret of the high efficiency of my material as a larvicidal agent is due to the fact that this film-like oily matter which rises to the surface of the partial emulsion is composed of the essential larvicidal agent in the tar. Quite possibly during the emulsification process the more inert constituents of the tar are emulsified but the larvicidal toxic materials are not emulsified to nearly as great an extent. This means that when my product is applied to a stagnant pool of water the lethal portions of the emulsion rise to the surface at once and form a film thereon. If emulsification were carried beyond the stage described above the emulsion might be so stable that it would merely mix with the stagnant water and would not form a larvicidal film at the surface where the larvae come for air.

In use the product of my invention can be diluted with any desired amount of water prior to application. Before dilution it should be well agitated to temporarily disperse any oil film which may be present on the surface. Also before application to lakes, marshes and the like, the diluted product should be well stirred. Immediately after application to the pond or marsh the film described above ascends to the surface where it attacks larvae.

Moreover, my emulsion, when prepared as described above, is incomplete in the sense that it is quick-breaking. Shortly after application to large bodies of water it shows a definite tendency to break and release the partially emulsified globules of tar and oil. For larvicidal purposes this is extremely advantageous.

Although I have given quite specific proportions of materials in the above example it is to be understood that I can depart therefrom to a reasonable extent. For example, I can use a ratio of water gas tar and gas oil of one to one instead of the two to one of the above example. The amount of soap used as an emulsifying agent can be varied over a rather wide limit. Enough should be present to insure a partial emulsification of the tar and oil, but an excess is not harmful since the degree of emulsification is largely controlled by the extent of mixing. Likewise, the amount of rosin can vary, and I do not wish to be limited to any specific quantities.

Having thus described my invention, what I claim is:

1. A larvicidal agent comprising a partial emulsion of water gas tar and gas oil in a tallow soap aqueous solution, said emulsion being of the type that it readily breaks upon application to the surface of a body of water for treatment of said body of water.

2. A larvicidal agent comprising a partial emulsion of water gas tar and gas oil in an aqueous tallow soap solution containing rosin, said emulsion being of the type that it readily breaks upon application to the surface of a body of water for treatment of said body of water.

3. A larvicidal emulsion, characterized by its quick breaking tendency upon application to the surface of an object, comprising water gas tar, gas oil, dispersed in an aqueous medium wherein a soap is the emulsifying agent.

4. A larvicidal emulsion, characterized by its quick breaking tendency upon application to the surface of an object, and containing about four parts by weight of water gas tar, two parts by weight of gas oil, about three parts by weight of a soap and sufficient water to form a fluid mixture.

5. The process of preparing a larvicidal agent which comprises emulsifying water gas tar and gas oil in an aqueous medium containing soap, the emulsification being stopped at a point where the emulsion, on standing, yields a thin film on the surface thereof of unemulsified globules.

6. The process as in claim 5 wherein the ratio of water gas tar to gas oil is about two to one.

WALTER D. MARTIN.